United States Patent [19]

Graziano et al.

[11] Patent Number: 5,178,776
[45] Date of Patent: Jan. 12, 1993

[54] METHOD OF CONVERTING BIOLOGICAL WASTE FOR AGRICULTURAL USE

[75] Inventors: Luigi Graziano; Giampiero Morgantini; Roberto Pellegrin, all of Turin; Paolo Peri, Rome, all of Italy

[73] Assignee: Romfin S.R.L., Italy

[21] Appl. No.: 814,374

[22] Filed: Dec. 26, 1991

[30] Foreign Application Priority Data

Sep. 17, 1991 [IT] Italy .............................. TO91A000701

[51] Int. Cl.$^5$ ......................... C02F 1/76; B01D 35/18
[52] U.S. Cl. ................................... 210/754; 210/688; 210/749; 210/758; 210/774; 210/805; 210/903; 55/36
[58] Field of Search ............... 210/774, 761, 605, 607, 210/618, 660, 705, 758, 724, 768, 615, 903, 754, 688, 749, 805; 55/36

[56] References Cited

U.S. PATENT DOCUMENTS

| | | | |
|---|---|---|---|
| 3,920,548 | 11/1975 | Fassell et al. | 210/761 |
| 4,119,495 | 10/1978 | Belyaev et al. | 210/774 |
| 4,191,549 | 3/1980 | Boyko | 210/660 |
| 4,256,630 | 3/1981 | Fremont | 210/768 |
| 4,377,486 | 3/1983 | Barrick et al. | 210/724 |
| 4,673,510 | 6/1987 | Samusch et al. | 210/774 |
| 4,689,156 | 8/1987 | Zibrida | 210/903 |
| 4,842,715 | 6/1989 | Paspek, Jr. et al. | 210/758 |
| 4,988,442 | 1/1991 | Highsmith et al. | 210/774 |
| 5,022,993 | 6/1991 | Williamson | 210/615 |
| 5,051,191 | 9/1991 | Rasmussen et al. | 210/758 |

FOREIGN PATENT DOCUMENTS

| | | | |
|---|---|---|---|
| 7117036 | 5/1971 | Japan | 210/774 |
| 7608694 | 5/1976 | Netherlands | 210/774 |

*Primary Examiner*—Robert A. Dawson
*Assistant Examiner*—Ana M. Fortuna
*Attorney, Agent, or Firm*—Armstrong & Kubovcik

[57] ABSTRACT

The treatment of biological masses to produce a solid material which can be used as an agricultural fertilizer and/or conditioner includes the subjecting of the biological mass, which is in the fluid state and is composed of a solid phase and an aqueous phase, to a combined heat and chemical treatment involving heating, acidification, and chlorinating oxidation so as to dissolve insoluble metallic and non-metallic compounds in the biological mass and transfer them from the solid phase to the aqueous phase, pasteurize the micro-organisms, disinfect the mass as regards pathogenic germs, and sterilize seeds. After this combined treatment, the solid phase is separated from the aqueous phase and recovered.

3 Claims, No Drawings

METHOD OF CONVERTING BIOLOGICAL WASTE FOR AGRICULTURAL USE

The present invention relates in general to the treatment of biological masses, such as aerobic and anaerobic sludges produced during processes for purifying effluent liquids, and biomasses produced by the aerobic or anaerobic fermentation of refuse.

Biological purification treatments always give rise to sludges which are constituted by mixtures of solid organic and inorganic substances and water and which have to be removed from the purification system.

The sludges are contaminated, to a variable extent, depending upon the type of liquid sent for purification, by metals and non-metals in the form of compounds which are almost insoluble in water, as well as by bacteria and eggs and seeds of various kinds.

Some chemical elements are toxic to crops and others are metabolised and become toxic within the food cycle and, despite the good fertilising properties of their organic matrices, biological sludges contaminated by these elements, particularly those defined as heavy metals, cannot be used extensively in agriculture.

Moreover, since waste from hospitals and slaughterhouses. as well as the excrement of domestic animals normally flow into purifiers in urban centres, the sludges contain pathogenic micro-organisms which are not destroyed during the purification treatment.

Another aspect which makes the sludge unacceptable for agricultural use is the presence of live seeds of many different fruits (tomatoes, water-melons, melons, cucumbers, apples, pears, kiwi fruits, peppers, basil, figs, grapes, etc.) so that any specific crops on which the sludge is spread may become infested.

All this helps to make biological sludges unusable and they therefore have to be disposed of by expensive systems, for example, by dumping or destruction by heat.

The same problems exist in relation to biomasses produced by the anaerobic or aerobic fermentation of urban refuse such as, for example, the products of composting which generally have high heavy-metal contents.

The method of the present industrial invention, as defined in the following claims, is intended to convert the aforementioned biological masses so as to produce a solid product suitable for any agronomical use.

SUMMARY OF THE INVENTION

The subject of the invention is a method of treating biological masses to produce a solid material which can be used as an agricultural fertiliser and/or conditioner, characterized in that it includes the steps of:
subjecting the biological mass, which is in the fluid state and is composed of a solid phase and an aqueous phase, to a combined thermal and chemical treatment involving heating, acidification and oxidation, under acidic conditions by means of an oxidizing agent selected from the group consisting of chloronating oxidazing agents and persulphuric acid salts;
separating the solid phase from the aqueous phase and recovering the solid phase.

DESCRIPTION OF THE PREFERRED EMBODIMENTS

The method enables the metals and non-metals to be dissolved so that they are transferred into the solvent constituted by the aqueous phase (and and are then separated therefrom and finally eliminated), and enables the biomass to be pasteurised so that pathogenic germs are eliminated and the eggs of worms and insects and unwanted seeds are sterilised, leaving the mass with the fertilising properties of the organic matrix.

Particularly in sludges of anaerobic origin, the undesired chemical elements are present in the solid phase in the form of compounds (sulphides) which are extremely insoluble in water not only at a neutral pH, but also at acid or alkaline pHs.

It is very difficult to eliminate these elements since the solid phase is composed of very many other substances which may react and, if special measures are not used, may use up the various chemical products which are intended to extract the elements.

The characteristic of the present invention is that it achieves its objective with the use of small quantities of reagents and operative conditions which do not destroy or break down the organic matrix, whilst completely dissolving the compounds of the elements which, particularly in anaerobic biomasses, have characteristics of great stability.

When biological masses have to be analysed to determine their contents of these elements, laboratory chemists use methods of destructive attack which are described in the literature and in official methodologies and in which very concentrated, boiling, strong acids such as nitric or perchloric acid and the like are used.

No industrial method like the subject of the present invention has yet been described for treating biological masses in order to extract and eliminate the aforementioned elements and nor have laboratory methods been described which could in some way be comparable to the method claimed.

Moreover, the originality of the method is connected with the fact that, regardless of the way in which the treatment is carried out in the plant, with a continuous or discontinuous flow, it also pasteurises the microbial and the pathogenic-germ contents and sterilises the seeds and eggs.

The method of converting biological masses enables a particular thermal-chemical environment to be produced by means of three elementary steps, that is, heating, acidification and oxidation by means of the above quoted reagents, which are carried out on the crude fluid biomass and should preferably be executed in the order given but may also be effected in a different order, or simultaneously, to achieve the same final results although with the use of more of the reagents.

According to another optional, but preferred, characteristic, after the thermal-chemical treatment which dissolves the elements in the aqueous phase, the method includes a step for making insoluble the metals and non-metals which have been extracted from the crude biological mass (and are now present in the aqueous phase) and, at the same time, removing ammonia which is then absorbed by the solid, purified product, neutralising its pH and enriching it with ammoniacal nitrogen.

The method is preferably carried out by heating the crude biological mass, which is in a fluid and pumpable form (because it is withdrawn before any drying step, or even after such a step, in which case it is made fluid by mashing with added water) by blowing in live steam or by indirect heat-exchange in a stirred container. The final temperature reached should be between 70° and 100° C. (the optimal temperature is 90° C.).

Acid (preferably sulphuric acid but other mineral acids are also suitable) is then added slowly until a pH of between 1.0 and 5.0 is reached; the optimal value for the purposes of the least overall consumption of the oxidizing reagents added to dissolve undesired elements and destroy micro-organisms has been found to be 2.5–3.

Commercial sodium hypochlorite is the preferred chlorinating oxidizing agent, which, under the operative conditions, liberates active chlorine which can rapidly dissolve the chemical elements to be eliminated and completely sterilize the seeds of fruit, eggs and larvae; the added amount depends on concentration of solids in the sludge and concentration of the available commercial product.

Other oxidising reagents which liberate chlorine or chlorine dioxide such as, for example, gaseous chlorine, chlorine dioxide or sodium chlorite and chloroamine may alternatively be used but sodium hypochlorite is the cheapest reagent and the easiest to use.

Ammonium persulphate, and alkali or alkali-earth metal salts of persulphuric acid may be used as the oxidizing agent.

The hydrogen sulphide liberated during the acidification can be absorbed in a column filled with a flow of sodium hydroxide solution and then re-used during the chemical purification from the liquid of the elements extracted by the first part of the process.

The fluid mass is decanted and dried on a filter press or some other mechanical drying means preferably selected from those which enable the solid residue to be washed with water and dried with air in order to remove as much as possible of the dissolved elements (which remain in the aqueous phase) and to produce as dry a substance as possible.

The filtrate is treated at a temperature of between 60° and 100° C. to make the toxic elements extracted insoluble and to eliminate the dissolved ammonia by introducing it into a closed container vented to an absorber and adding thereto an absorption solution of hydrogen sulphide or, alternatively, calcium oxide or calcium hydroxide, in powder form or in suspension, to a pH which may vary between 8.5 and 14 (the optimal value is 10.0).

The ammonia liberated in gaseous form is absorbed in water and the solution is reused by being mixed with the purified and dried sludge to neutralize it and enrich it with nitrogen for agricultural use.

The elements which were in the solid phase in the sludge and had been dissolved in the aqueous phase are made completely insoluble by the alkaline solution produced by absorbtion during the acidification step, that is, the sodium sulphide solution.

The liquid, thus purified of the metal and non-metal elements already extracted from the solid phase, may be decanted and filtered and then recycled to a purification plant.

The purified solid product produced by the method, which has very good fertilising and conditioning characteristics like a good-quality humus or manure, containing nitrogen and phosphorus as well as an organic matrix which can easily be absorbed by the crops, can be used as it is or even with the addition of other fertilising elements such as potassium and trace elements such as molybdenum, boron, cobalt, etc.

EXAMPLES

Example 1

A liter of anaerobic biological sludge extracted from a digester and thickened until its solids content was 3.75% was heated to a temperature of 90° C. over a period of half an hour by the blowing-in of live steam.

9 grams of 96% sulphuric acid were added slowly over a period of half an hour to produce a pH of 2.5.

25 grams of a commercial solution of sodium hypochlorite with 15% of active chlorine were added slowly over a period of half an hour.

The sludgy suspension was filtered and the residue washed with water and dried.

The residue produced contained no toxic metals or non-metals, the micro-organisms had been pasteurised and the eggs, pathogenic germs and seeds had been sterilised and, after alkalisation to a pH greater than 7.0, the residue was usable in agriculture.

Naturally, the quantities may vary in dependence on the solids content of the sludge to be treated and on its particular characteristics which result from the biological purification conditions and from the origin and collection of the sewage sent to the purifier.

Example 2

A liter of compost which had been made fluid until its solids content was 7.2% was heated to 90° C. and, at the same time, sulphuric acid to produce a pH of 2.5 and 30 grams of sodium hypochlorite with 15% of active chlorine were added over a period of half an hour.

Filtration was carried out as in Example 1 and, after alkalisation to a pH greater than 7.0, the separated solid residue was used in agriculture since the biomass contained no toxic metals or non-metals and was sterile.

Example 3

A liter of aerobic biological sludge with a solids content of 2.5% was heated indirectly to 90° C.

Sulphuric acid was added up to a pH of 3.5 and 3 grams of chlorine gas were bubbled in slowly below the surface of the liquid.

Filtration was carried out as in the preceding examples and the solid residue obtained contained no toxic metals or non-metals, was sterile and, after alkalisation to a pH greater than 7.0, was usable in agriculture.

Example 4

Calcium hydroxide and sodium sulphide were added to the filtrate produced in Examples 1, 2 and 3 at a temperature of 90° C.

The ammonia gas liberated was absorbed in water and the solution was used to alkalise the filtration residue produced previously and to enrich it with nitrogen improving its fertilising properties and at the same time removing the contaminant from the filtrate.

Example 5

A liter of anaerobic biological sludge was treated as in Example 1.

The hydrogen sulphide gas liberated during the acidification stage was absorbed in sodium hydroxide solution.

Instead of being destined for expensive and useless disposal, the sulphide solution thus obtained was used within the method itself, instead of calcium hydroxide or oxide, for the purification of the liquid in order to make the metals and non-metals extracted from the starting biological sludge completely insoluble again thus achieving better purification of the liquid with the introduction of less reagents into the system from outside.

What is claimed is:

1. A method of treating a metals-containing biological mass to produce a solid material which can be used as a agricultural fertilizer or soil conditioner, comprising the steps of:

subjecting the biological mass, which is in a fluid state comprising a solid phase and an aqueous phase, to a combined thermal and chemical treatment comprising heating, acidification and chlorinating oxidation and under acidic conditions by means of an oxidizing agent selected from the group consisting of chlorinating oxidizing agents and persulfuric acids, separating and recovering the solid phase and the aqueous phase said aqueous phase containing metals and ammonia; and recovering solid phase and aqueous phase;

purifying the aqueous phase containing metals and ammonia by heat treatment with the addition of at least one compound selected from the group consisting of calcium hydroxide, calcium oxide and sodium sulphide so as to make the metals insoluble and to remove ammonia;

absorbing the ammonia in an aqueous solution, and mixing the ammonia-containing solution with the recovered solid phase to neutralize the solid phase and to enrich it in nitrogen.

2. A method of treating a metals-containing biological mass to produce a solid material which can be used as a agricultural fertilizer or soil conditioner, comprising the steps of:

subjecting he biological mass, which is in a fluid state comprising a solid phase and an aqueous phase, to a combined thermal and chemical treatment comprising heating, acidification and chlorinating oxidation and under acidic conditions by means of an oxidizing agent selected from the group consisting of chlorinating oxidizing agents and persulfuric acids, wherein said acidification involves the evolution of hydrogen sulphide;

separating the solid and aqueous phases;

absorbing in an aqueous sodium hydroxide solution, said hydrogen sulphide evolved as a result of acidification of the mass to produce an aqueous solution of sodium sulphide, and purifying the separated aqueous phase by heat treatment and by addition thereto of the thus-formed sodium sulphide solution so as to make insoluble the therein-contained metals and to remove ammonia.

3. A method according to claim 2, further comprising absorbing the ammonia in an aqueous solution, and mixing the ammonia-containing solution with the recovered solid phase to neutralize the solid phase and to enrich it in nitrogen.

* * * * *